United States Patent
Carvajal et al.

(10) Patent No.: US 10,734,124 B2
(45) Date of Patent: Aug. 4, 2020

(54) HEAT PIPE ASSEMBLY OF NUCLEAR APPARATUS HAVING FIBER OPTICAL TEMPERATURE DETECTION SYSTEM

(71) Applicant: Westinghouse Electric Company LLC, Cranberry Township, PA (US)

(72) Inventors: Jorge V. Carvajal, Irwin, PA (US); Thomas W. Tweedle, Sewickley, PA (US); Raghu K. Avali, Wexford, PA (US); Yasir Arafat, Pittsburgh, PA (US); Matthew R. Heisel, Pittsburgh, PA (US); Jurie Van Wyk, Cranberry Township, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 200 days.

(21) Appl. No.: 15/830,654

(22) Filed: Dec. 4, 2017

(65) Prior Publication Data

US 2019/0172597 A1   Jun. 6, 2019

(51) Int. Cl.
| | |
|---|---|
| *G21C 17/017* | (2006.01) |
| *G21C 15/02* | (2006.01) |
| *G01K 11/32* | (2006.01) |
| *G21C 17/112* | (2006.01) |
| *G21C 17/022* | (2006.01) |
| *G21D 3/04* | (2006.01) |
| *G01D 5/26* | (2006.01) |

(Continued)

(52) U.S. Cl.
CPC ............ *G21C 17/017* (2013.01); *G01K 11/32* (2013.01); *G21C 15/02* (2013.01); *G21C 17/022* (2013.01); *G21C 17/112* (2013.01); *G01D 5/268* (2013.01); *G01K 1/02* (2013.01); *G01K 13/02* (2013.01); *G21D 3/04* (2013.01)

(58) Field of Classification Search
CPC .......... G01K 11/32; G01K 1/02; G01K 13/02; G01D 5/268; G21C 15/02; G21C 17/112; G21C 17/017
See application file for complete search history.

(56) References Cited

U.S. PATENT DOCUMENTS

| | | | |
|---|---|---|---|
| 8,467,426 B2 * | 6/2013 | Ichkhan | F28D 15/0275 372/36 |
| 10,120,102 B2 * | 11/2018 | Tsakalakos | E21B 47/1005 |

(Continued)

FOREIGN PATENT DOCUMENTS

| | | | | |
|---|---|---|---|---|
| EP | 0438880 A2 * | 7/1991 | ............ | G01J 5/0014 |
| JP | 2010028016 A * | 2/2010 | | |

*Primary Examiner* — Lily C Garner
(74) *Attorney, Agent, or Firm* — K&L Gates LLP

(57) ABSTRACT

A heat pipe assembly of a nuclear apparatus includes a number of elongated heat pipes and a detection system having one or more fiber optic cable assemblies that are elongated and are wrapped in a helical fashion along an exterior surface of one or more of the heat pipes. The detection system further includes an optical signal generator that supplies to each, fiber optic assembly an optical signal and additionally includes a sensor that detects a number of reflections of the optical signal and generates an output. The output is usable by an instrumentation and control system to determine a number of temperatures along one or more of the heat tubes by detecting a temperature at each of a plurality of locations along each fiber optic cable assembly.

10 Claims, 3 Drawing Sheets

(51) Int. Cl.
*G01K 1/02* (2006.01)
*G01K 13/02* (2006.01)

(56) References Cited

U.S. PATENT DOCUMENTS

2012/0123702 A1* 5/2012 Chen .................... G01K 11/32
  702/42
2016/0027536 A1* 1/2016 McClure ................ G21C 1/02
  376/277
2016/0370238 A1* 12/2016 Peck, Jr. ................ G01K 7/00

* cited by examiner

HEAT PIPE ASSEMBLY OF NUCLEAR APPARATUS HAVING FIBER OPTICAL TEMPERATURE DETECTION SYSTEM

BACKGROUND

1. Field

The disclosed and claimed concept relates generally to nuclear apparatuses and, more particularly, to a heat pipe assembly having a detection system that employs fiber optic cable assemblies to detect temperatures at a number of locations on each of a plurality of heat pipes of a nuclear apparatus.

2. Related Art

Numerous types of nuclear power generation systems are known to exist in the relevant art. Such nuclear power generation systems typically involve a nuclear reactor within which a fission reaction occurs. A fluid is pumped through the reactor to remove heat from the reactor, and the heated fluid is then typically passed through a heat exchanger in order to extract heat that is employed to operate a turbine that turns an electrical generator, by way of example.

Because of the extreme temperatures and other factors that are involved, it is desirable to know the various temperatures that are in existence at various locations in the nuclear environment. It is also known, however, that each temperature sensing device in the nuclear environment must be individually wired, and a very large number of temperature sensors can result in a correspondingly very large number of pairs of wires that connect the sensors to computerized data systems and the like. Improvements thus would be desirable.

SUMMARY

An improved heat pipe assembly of a nuclear apparatus includes a number of elongated heat pipes and a detection system having one or more fiber optic cable assemblies that are elongated and are wrapped in a helical fashion along an exterior surface of one or more of the heat pipes. The detection system further includes an optical signal generator that supplies to each fiber optic assembly an optical signal and additionally includes a sensor that detects a number of reflections of the optical signal and generates an output. The output is usable by an instrumentation and control system to determine a number of temperatures along one or more of the heat tubes by detecting a temperature at each of a plurality of locations along each fiber optic cable assembly.

Accordingly, an aspect of the disclosed and claimed concept is to provide a heat pipe assembly of a nuclear apparatus wherein a detection system employs a fiber optic cable assembly that is, helically wound along an exterior surface of a heat pipe and that is used to detect a number of temperatures along the heat pipe.

Another aspect of the disclosed and claimed concept is to provide such a heat pipe assembly wherein the fiber optic cable assembly is wrapped in a helical fashion along each of a plurality of heat pipes in order to reduce the number of data channels that are required.

Another aspect of the disclosed and claimed concept is to provide a detection system that provides a temperature measurement at each of a plurality of locations from a single optical data channel.

Accordingly, an aspect of the disclosed and claimed concept is to provide an improved heat pipe assembly of a nuclear apparatus. The heat pipe assembly can be generally stated as including a number of heat pipes, the number of heat pipes each being, elongated and being of a substantially circular cross section, a detection system structured to determine a number of temperatures at each of a number of location along each of at least a subset of the heat pipes of the number of heat pipes, the detection system can be generally state as including at least a first fiber optic cable assembly that is elongated and is wrapped in a helical fashion onto an exterior surface of a heat pipe of the at least subset, the detection system can be stated as further including an optical signal generator that is structured to generate an optical signal and to supply the optical signal to the fiber optic assembly, the detection system can be stated as further including a sensor that is structured to detect a number of reflections of at least a portion of the optical signal from each of a number of locations along at least a portion of the length of the fiber optic assembly and to generate an output that is representative at least in part of at least some of the number of reflections, and an instrumentation system structured to receive the output and to determine, based at least in part upon the output, the number of temperatures.

BRIEF DESCRIPTION OF THE DRAWINGS

A further understanding of the disclosed and claimed concept can be gamed from the following Description when read in conjunction with the accompanying drawings in which:

Similar numerals refer to similar parts throughout the specification.

DESCRIPTION

Figure 1:
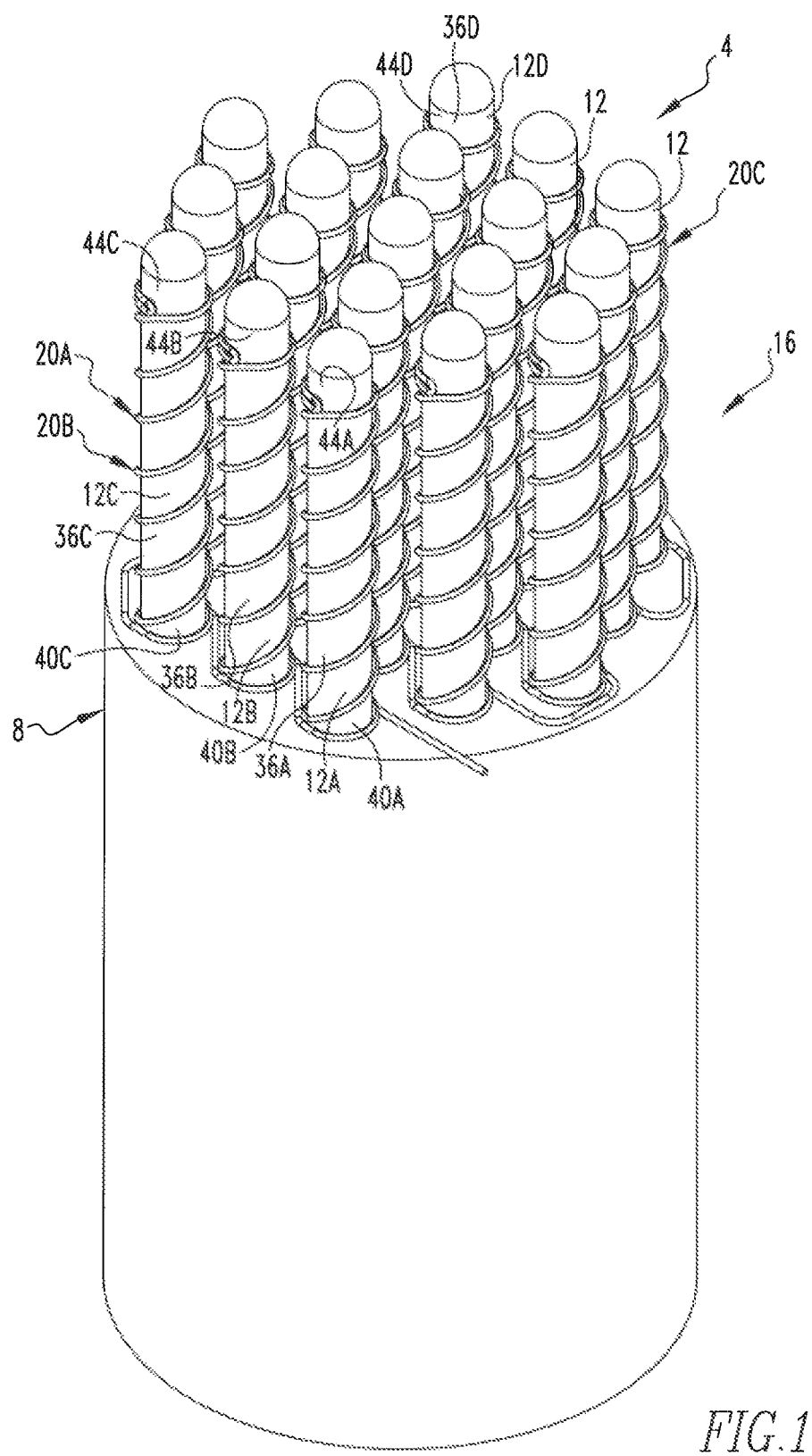
FIG. 1 is a perspective view of an improved heat pipe assembly in accordance with the disclosed and claimed concept.
Figure 2:
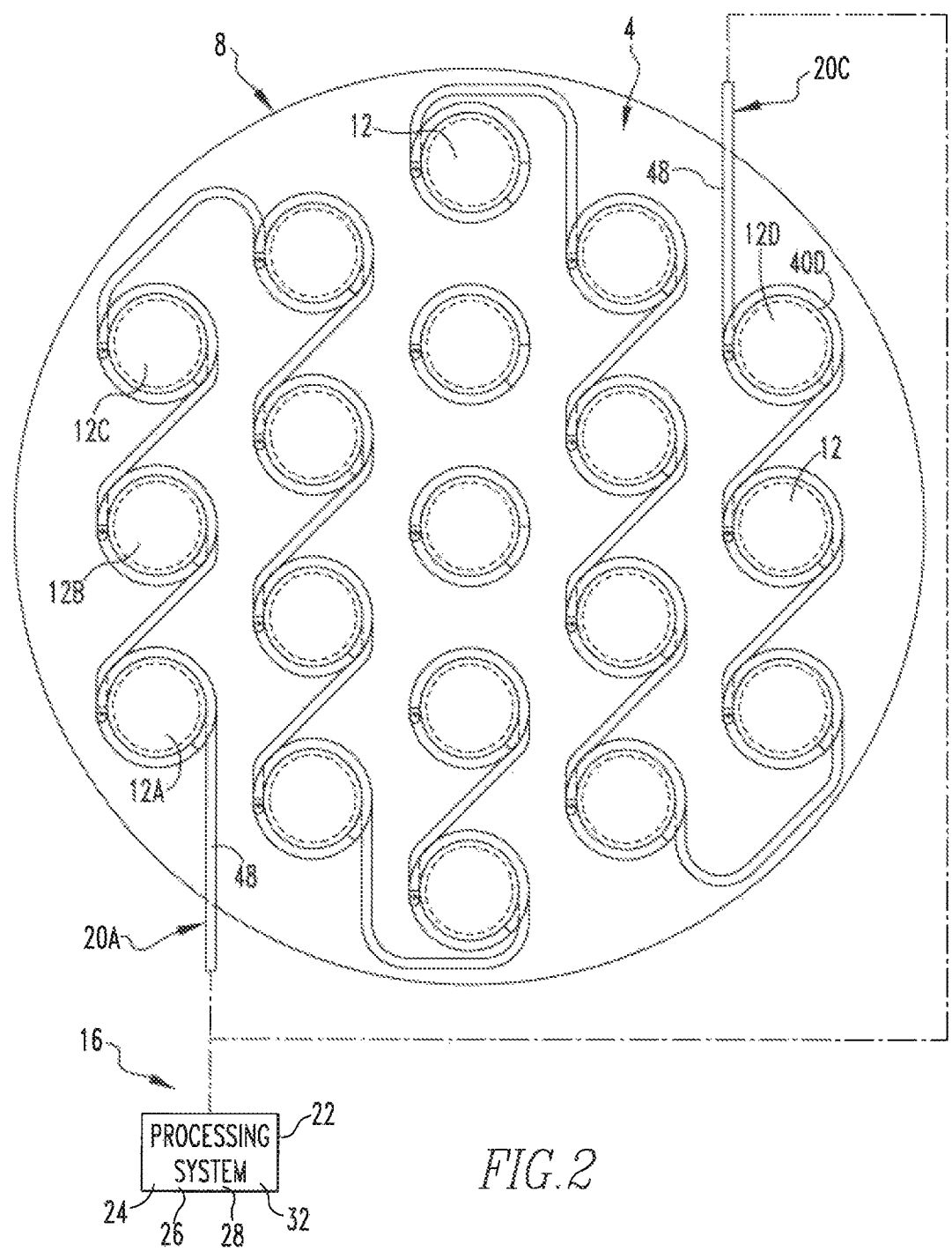
FIG. 2 is a top plan view of the heat pipe assembly of FIG. 1.

An improved heat pipe assembly 4 is depicted generally in FIGS. 1 and 2. The heat pipe assembly 4 is a component of a nuclear apparatus 8 of which many types exist. The heat pipe assembly 4 can be said to include a plurality of heat pipes, some of which are indicated at the numerals 12A, 12B, 12C, and 12D, and which may be collectively or individually referred to herein with the numeral 12. The heat pipes 12 are each elongated and of a circular cross section. and the heat pipes 12 are configured to carry therein a heated fluid from one location to another of the nuclear apparatus 8. The heat pipes 12 that are depicted in FIGS. 1 and 2 are exemplary in nature only, it being understood that the nuclear apparatus 8 more likely includes several thousand such heat pipes 12 rather than the mere nineteen that are expressly depicted.

The heat pipe assembly 4 further includes a detection system 16 that is configured to detect a number of temperatures at a number of positions along the longitudinal extent of each of a number of the heat pipes 12. As employed herein, the expression "a number of" and variations thereof shall refer broadly to any non-zero quantity, including a quantity of one. The detection system further includes a plurality of fiber optic cable assemblies, some of which are indicted at the numerals 20A, 20B, and 20C, and which may be collectively or individually referred to herein with the numeral 20. The detection system 16 can further be said to include a processing system 22 with which the fiber optic cable assemblies 20 are each connected.

The processing system 22 can be said to include an optical signal generator 24, a signal measurement apparatus 26 that includes an array of sensors 28, and an instrumentation and control system 32. The optical signal generator 24 is configured to generate an optical signal that is output to one or more of the fiber optic cable assemblies 20. The array of sensors 28 include a plurality of optical sensors, and each fiber optic cable assembly 20 has a corresponding optical sensor of the array of sensors 28.

When the optical signal generator 24 inputs an optical signal 34 to a first end of the fiber optic cable assemblies 20, portions of the optical signal 34 are reflected from various locations along the length of the fiber optic cable assemblies 20 back to the first end, and such reflected portions of the optical signal 34 are detected as a number of reflections 38 by the corresponding sensor 28. The time that has elapsed between the input of the optical signal 34 to the fiber optic cable assemblies 20 and the detections of the various reflections 38 by the array of sensors 28 is indicative of the distances from the first end along the fiber optic cable assembly 20 at which the various reflections occurred based upon the optical signal 34 traveling through the fiber optic cable assembly 20 at the speed of light. The amplitude of the detected signal of each such reflection 38 is indicative of the corresponding temperature at each such reflection location along the fiber optic cable assembly 20.

The fiber optic cable assemblies 20 each include a number of fiber optic cables 52 that are doped with various materials that are optimized to be responsive to temperature. The fiber optic cables 52 can be doped with other materials that are optimized to detect other properties of the heat pipes 12 if needed.

Figure 3:
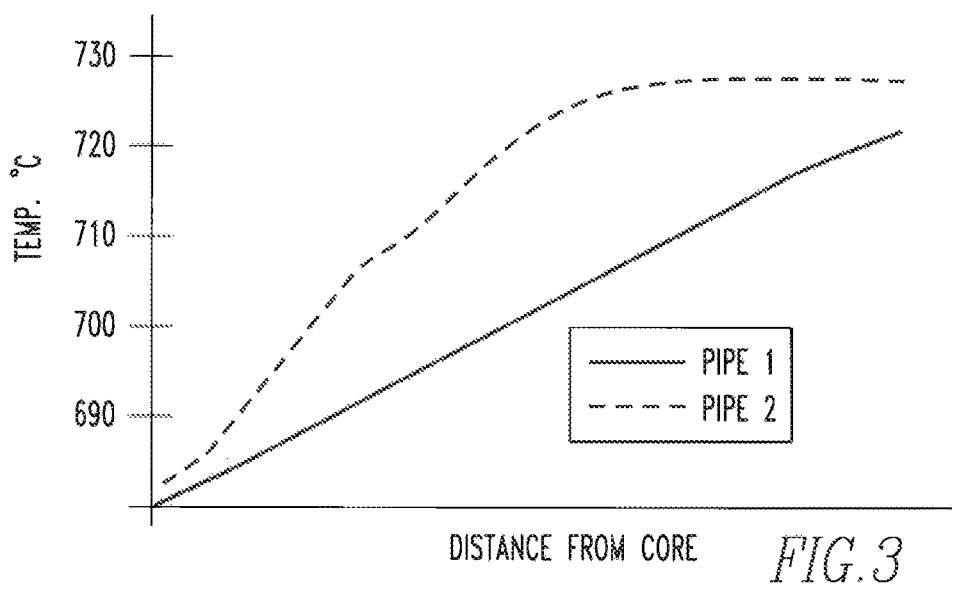
FIG. 3 is a graphical depiction of a temperature profile of a number of heat pipes of the heat pipe assembly of FIG. 1.

The signal measurement apparatus 26 generates a signal that is provided as an output 42 to the instrumentation and control system 32 and which is interpreted by the instrumentation and control system 32 into a plurality of temperatures at a plurality of locations along each of a number of the heat pipes 12. The instrumentation system 32 can then generate a visual output, such as is depicted generally in FIG. 3, which depicts a temperature profile for one or more of the heat pipes 12 as needed. The exemplary graph depicted in FIG. 3 is intended to illustrate one way in which the temperature data can be presented, it being understood that other data presentation systems can be employed, such as those including the use of color and/or any of a wide variety of other data presentation techniques. The instrumentation and control system 32 further electronically outputs a temperature signal 46 that is used for other purposes, as will be set forth in greater detail below.

As can be understood from FIG. 1, the heat pipes 12 each include an exterior surface, some of which are indicated at the numerals 36A, 36B, 36C, and 36D, and which, may be collectively or individually referred to herein with the numeral 36. The heat pipes 12 each additionally include, a first end, some of which are indicated at the numerals 40A, 40B, 40C, and 40D, which may be collectively or individually referred to herein with the numeral 40, and a second end opposite thereto, some of which are indicated at the numerals 44A, 44B, 44C, and 44D, which may be collectively or individually referred to herein with the numeral 44.

As can be understood from FIGS. 1 and 2, the fiber optical cable assembly 20A is wrapped in a helical fashion beginning, for example, with the heat pipe 12A and, more specifically, at the first end 40A of the heat pipe 12A. Such helical wrapping continues along the longitudinal extent of the heat pipe 12A on the exterior surface 36A until the fiber optic cable assembly 20A reaches approximately the second end 44A. The fiber optic cable assembly 20A then extends from the second end 44A of the heat pipe 12A to the second end 44B of the heat pipe 12B. The fiber optic cable assembly 20A is then wrapped in a helical fashion from the second end 44B until it reaches approximately the first end 40B of the heat pipe 12B. The fiber optic cable assembly 20A then extends from the first end 40B of the heat pipe 12B to the first end 40C of the heat pipe 12C. The fiber optic cable assembly 20A is then wrapped in a helical fashion along the heat pipe 12C from the first end 40C until it reaches approximately the second end 41C, at which point, the fiber optic cable assembly 20A will then extend to another heat pipe 12 and will be helically wrapped along its exterior surface 36 back to the first end 40 thereof, and so forth onto other heat pipes 12.

As can further be understood from FIG. 1, the fiber optic cable assembly 20B likewise extends along the exterior surfaces 36 of the heat pipes 12A, 12B, and 12C, albeit at locations along the exterior surfaces 36 spaced from the fiber optic cable assembly 20A such that the fiber optic cable assembles 20A and 20B form a double helix wrapping pattern along the exterior surfaces 36 of the heat pipes 12. The use of a pair of the fiber optic cable assemblies 20 can provide redundancy of temperature detection or can be configured to provide a greater granularity to the temperature detections along the length of the heat pipes 12. Other variations will be apparent.

FIGS. 1 and 2 indicate that the fiber optic cable assembly 20C extends along the exterior surfaces 36 of other heat pipes 12, including the heat pipe 12D. Again, the fiber optic cable assembly 20C is wrapped in a helical fashion, as are all of the other fiber optic cable assemblies 20 wrapped in a helical fashion along the exterior surfaces 36 of the heat pipes 12.

As a general matter, each fiber optic cable assembly 20 is capable of returning temperature reflections at two hundred locations along the length of the fiber optic cable assembly 20. In this regard, therefore, it can be understood that each fiber optic cable assembly 20 constitutes a single optical data channel that is capable of returning two hundred separate temperature values. By way of example, it may be desirable to detect the temperature at perhaps five locations along the longitudinal extent of each heat pipe 12. If, for instance, the heat pipe assembly 4 includes three thousand heat pipes 12, the detection of temperatures at five locations along each such heat pipe 12 would result in fifteen thousand measurement locations. If the aforementioned fifteen thousand temperature detections were made by fifteen thousand separate temperature sensors, this would result in a need for fifteen thousand coaxial or other wired data connections being connected between the heat pipes 12 and a data collection apparatus. This would require a large area for the passage of such wires, and the large number of wires and temperature sensors likely would have questionable reliability if only due to the large number thereof.

However, since a single fiber optic cable assembly 20 can return two hundred data values, i.e., one for each of two hundred locations along one or more of the heat pipes 12, this means that a mere seventy-five of the fiber optic cable assemblies 20 can be used to collectively result in fifteen thousand temperature data values. Employing seventy-five optical data channels as compared with fifteen thousand electronic data channels makes the detection of temperatures along the heat pipes 12 far more practical since optical temperature detection requires only one two-hundredth of the number of data channels as compared with individual electronic temperature sensors. This constitutes a substantial savings in space, cost, and reliability, which is highly advantageous.

Figure 5:
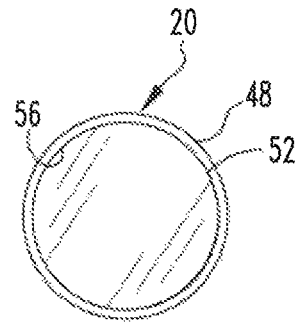
FIG. 5 is a cross sectional view of a fiber optic cable assembly of the heat pipe assembly of FIG. 1.

As can be understood from FIG. 5, the fiber optic cable assemblies 20 are each in the form of a tube 48 that can be said to form a sheath having an interior region 56 within which the fiber optic cable 52 is received. The tube 48 is itself receivable on the exterior surfaces 36 of the heat pipes 12. The tubes 48 protect the fiber optic cables 52 from damage and can ensure a more secure physical connection between the fiber optic cable 52 and the heat, pipes 12, which results in enhanced heat transfer to the fiber optic cable 52 and thus greater temperature accuracy.

Figure 4:
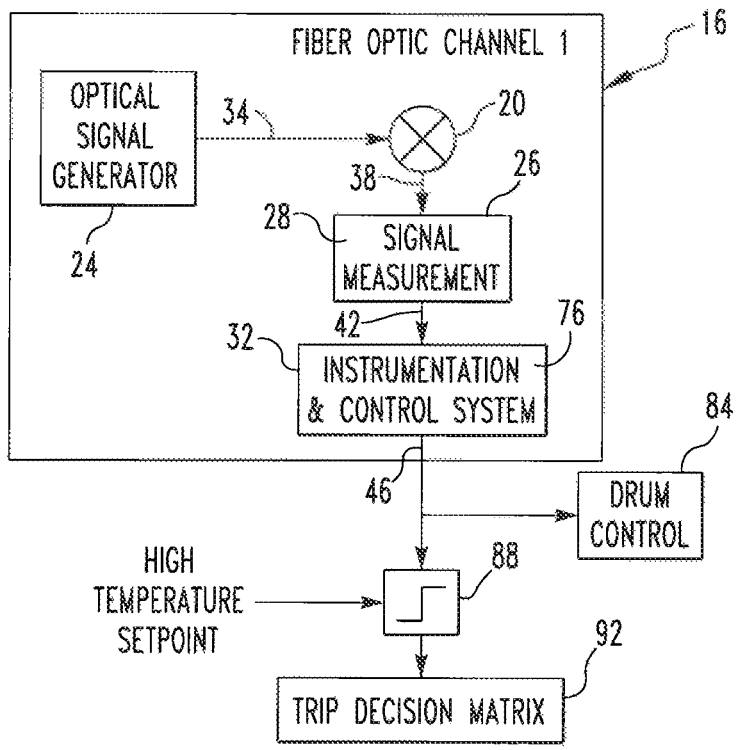
FIG. 4 is a schematic depiction of a detection system of the heat pipe assembly of FIG. 1.

As can be understood from FIG. 4, the processing system 22 includes the optical signal generator 24 which generates the optical signal 34 which is input to the fiber optic cable assemblies 20. Only a single fiber optic cable assembly 20 is depicted in FIG. 4 for the sake of simplicity of disclosure. A number of optical reflection signals are carried along and are detectable from the fiber optic cable assembly 20, and such optical reflection signals 38 are detected as an input by the array of sensors 28 of the signal measurement apparatus 26. The signal measurement apparatus 26 measures the amplitude and other properties of the detected optical reflection signals 38 and also measures the time delay between the generation of the optical signal 34 and the detection of the various optical reflection signals 38. The signal measurement apparatus 26 then generates the output 42 that is detected by the instrumentation and control system 32 and which is interpreted as being a number of temperatures at various locations along the heat pipes 12. In this regard, the instrumentation and control system will include various data 76 that may include, for instance, a model of the heat pipes 12 and the fiber optic cable assemblies 20 distributed thereon and other data which is usable to generate the various temperature outputs of the temperature signal 46 that is output by the instrumentation and control system 32.

The temperature signal 46 is then sent to a drum control system 84 that controls a control drum that is employed to adjust the reactivity of the nuclear apparatus 8. The temperature data 80 is also sent to a comparator 88 which has stored therein various data regarding high temperature setpoints of the nuclear apparatus 8. The comparator 88 generates another output that is delivered to a computer-based trip decision matrix 92 which can decide through the use of various routines whether to initiate a shutdown of the nuclear apparatus 8.

It thus can be seen that temperatures can be detected at various locations along the heat pipes 12 with a minimum of data channels by employing optical data channels afforded by the fiber optic cable assemblies 20 and the processing system 22. This is enabled inasmuch as the fiber optic cable assemblies 20 each can generate two hundred temperature signals from a signal data channel. Other benefits will, be apparent.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A heat pipe assembly of a nuclear apparatus, the heat pipe assembly comprising:
    a number of heat pipes, the number of heat pipes each being elongated and being of a substantially circular cross section;
    a detection system structured to determine a number of temperatures at each of a number of locations along each of at least a subset of the heat pipes of the number of heat pipes, the detection system comprising at least a first fiber optic cable assembly that is elongated and is wrapped in a helical fashion onto an exterior surface of a heat pipe of the at least subset;
    the detection system further comprising an optical signal generator that is structured to generate an optical signal and to supply the optical signal to the fiber optic assembly;
    the detection system further comprising a sensor that is structured to detect a number of reflections of at least a portion of the optical signal from each of a number of locations along at least a portion of the length of the fiber optic assembly, the detection system being structured to measure a number of elapsed times between the supplying of the optical signal and the detecting of the number of reflections, the number of elapsed times being indicative of a number of distances along the at least first fiber optic cable assembly at which the number of reflections occurred, the detection system further being structured to generate an output that is representative at least in part of at least some of the number of reflections; and
    an instrumentation system structured to receive the output and to determine, based at least in part upon the output, the number of temperatures.

2. A heat pipe assembly of a nuclear apparatus, the heat pipe assembly comprising:
    a number of heat pipes, the number of heat pipes each being elongated and being of a substantially circular cross section;
    a detection system structured to determine a number of temperatures at each of a number of locations along each of at least a subset of the heat pipes of the number of heat pipes, the detection system comprising at least a first fiber optic cable assembly that is elongated and is wrapped in a helical fashion onto an exterior surface of a heat pipe of the at least subset;
    the detection system further comprising an optical signal generator that is structured to generate an optical signal and to supply the optical signal to the fiber optic assembly;
    the detection system further comprising a sensor that is structured to detect a number of reflections of at least a portion of the optical signal from each of a number of locations along at least a portion of the length of the fiber optic assembly and to generate an output that is representative at least in part of at least some of the number of reflections;
    an instrumentation system structured to receive the output and to determine, based at least in part upon the output, the number of temperatures; and wherein the least first fiber optic cable assembly is wrapped in a helical fashion onto another exterior surface of another heat pipe of the at least subset.

3. The heat pipe assembly of claim 2 wherein e least optic cable assembly extends between the heat pipe and the another heat pipe.

4. The heat pipe assembly of claim 3 wherein the heat pipe and the another heat pipe extend generally parallel one another.

5. The heat pipe assembly of claim 3 wherein the least first fiber optic cable assembly is wrapped in a helical fashion onto a further exterior surface of a further heat pipe of the at least subset, and wherein the least first fiber optic cable assembly extends between the another heat pipe and the further heat pipe.

6. The heat pipe assembly of claim 5 wherein the heat pipe, the another heat pipe, and the further heat pipe each have a first end and a second end opposite one another, the first ends being adjacent one another, the least first fiber optic cable assembly extending between the heat pipe and the another heat pipe by extending between the second ends of the heat pipe and the another heat pipe, the least first fiber optic cable assembly extending between the another heat pipe and the further heat pipe by extending between the first ends of the another heat pipe and the further heat pipe.

7. The heat pipe assembly of claim 1 wherein the detection system further comprises a second fiber optic cable assembly that is elongated and is wrapped in a helical fashion onto the exterior surface.

8. A heat pipe assembly of a nuclear apparatus, the heat pipe assembly comprising:
- a number of heat pipes, the number of heat pipes each being elongated and being of a substantially circular cross section;
- a detection system structured to determine a number of temperatures at each of a number of locations along each of at least a subset of the heat pipes of the number of heat pipes, the detection system comprising at least a first fiber optic cable assembly that is elongated and is wrapped in a helical fashion onto an exterior surface of a heat pipe of the at least subset;
- the detection system further comprising an optical signal generator that is structured to generate an optical signal and to supply the optical signal to the fiber optic assembly;
- the detection system further comprising a sensor that is structured to detect a number of reflections of at least a portion of the optical signal from each of a number of locations along at least a portion of the length of the fiber optic assembly and to generate an output that is representative at least in part of at least some of the number of reflections;
- an instrumentation system structured to receive the output and to determine, based at least in part upon the output, the number of temperatures;
- wherein the detection system further comprises a second fiber optic cable assembly that is elongated and is wrapped in a helical fashion onto the exterior surface; and
- wherein at least a portion of the at least first fiber optic cable assembly that is wrapped onto the exterior surface and at least a portion of the second fiber optic cable assembly that is wrapped onto the exterior surface are spaced from one another to together form a double-helix pattern on the exterior surface.

9. The heat pipe assembly of claim 1 wherein the at least first fiber optic cable assembly comprises at least one fiber optic cable and a sheath, the at least one fiber optic cable being situated within the sheath, the sheath being wrapped onto the exterior surface.

10. The heat pipe assembly of claim 9 wherein the sheath is an elongated tube having an interior region the at least one fiber optic cable being situated within the interior region.

* * * * *